United States Patent
McHale et al.

(10) Patent No.: US 11,373,135 B2
(45) Date of Patent: Jun. 28, 2022

(54) SYSTEMS AND METHODS FOR ANALYZING DELIVERY RESTRICTIONS WHEN DELIVERING PRODUCTS ORDERED BY A CUSTOMER

(71) Applicant: Walmart Apollo, LLC, Bentonville, AR (US)

(72) Inventors: Brian G. McHale, Chadderton Oldham (GB); Parvez Musani, Bentonville, AR (US); Donald R. High, Noel, MO (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 708 days.

(21) Appl. No.: 15/646,462

(22) Filed: Jul. 11, 2017

(65) Prior Publication Data
US 2018/0012176 A1    Jan. 11, 2018

Related U.S. Application Data

(60) Provisional application No. 62/360,797, filed on Jul. 11, 2016.

(51) Int. Cl.
*G06Q 10/08* (2012.01)

(52) U.S. Cl.
CPC .............. *G06Q 10/0832* (2013.01)

(58) Field of Classification Search
CPC ........... G06Q 10/0832; G06Q 10/0833; G06Q 10/0835; G06Q 10/0837
See application file for complete search history.

(56) References Cited

U.S. PATENT DOCUMENTS

| 7,222,081 | B1 | 5/2007 | Sone |
| 8,108,259 | B2 | 1/2012 | Klingenberg |
| 2008/0162304 | A1* | 7/2008 | Ourega ............... G06Q 10/08 705/26.4 |
| 2009/0326971 | A1 | 12/2009 | Piccinini |
| 2012/0246077 | A1* | 9/2012 | Skaaksrud ........ H04W 12/0609 705/50 |
| 2013/0066744 | A1 | 3/2013 | Higgins |

(Continued)

OTHER PUBLICATIONS

Böse, Felix, Jakub Piotrowski, and Bernd Scholz-Reiter. "Autonomously controlled storage management in vehicle logistics—applications of RFID and mobile computing systems." International Journal of RF Technologies 1.1 (2009): 57-76. (Year: 2009).*

(Continued)

*Primary Examiner* — Emmett K. Walsh
(74) *Attorney, Agent, or Firm* — Fitch, Even, Tabin & Flannery, LLP

(57) ABSTRACT

In some embodiments, methods and systems are provided that provide for delivering products to customers while analyzing and satisfying product-associated and/or delivery location-associated restrictions. The delivery attempt of the products is commenced after the product-associated restrictions are determined to be satisfied. The delivery of the product or products to the customer or an authorized person is authorized after the delivery location-associated restrictions are determined to be satisfied.

12 Claims, 3 Drawing Sheets

(56) References Cited

U.S. PATENT DOCUMENTS

| | | | |
|---|---|---|---|
| 2014/0201100 A1* | 7/2014 | Rellas | G06Q 10/08 |
| | | | 705/330 |
| 2014/0279666 A1* | 9/2014 | Lievens | G06Q 10/0833 |
| | | | 705/339 |
| 2015/0120094 A1* | 4/2015 | Kimchi | G05D 1/00 |
| | | | 701/3 |
| 2015/0193731 A1 | 7/2015 | Stevens | |
| 2015/0242811 A1 | 8/2015 | Gillen | |
| 2015/0363843 A1 | 12/2015 | Loppatto | |
| 2016/0063435 A1 | 3/2016 | Shah | |
| 2016/0068264 A1* | 3/2016 | Ganesh | G05D 1/0676 |
| | | | 701/2 |
| 2016/0189101 A1* | 6/2016 | Kantor | G08G 5/0026 |
| | | | 705/338 |
| 2017/0372259 A1* | 12/2017 | Lesser | G01C 21/165 |

OTHER PUBLICATIONS

International Search Report and Written Opinion dated Sep. 27, 2017; in corresponding PCT App. No. PCT/US2017/41329.

\* cited by examiner

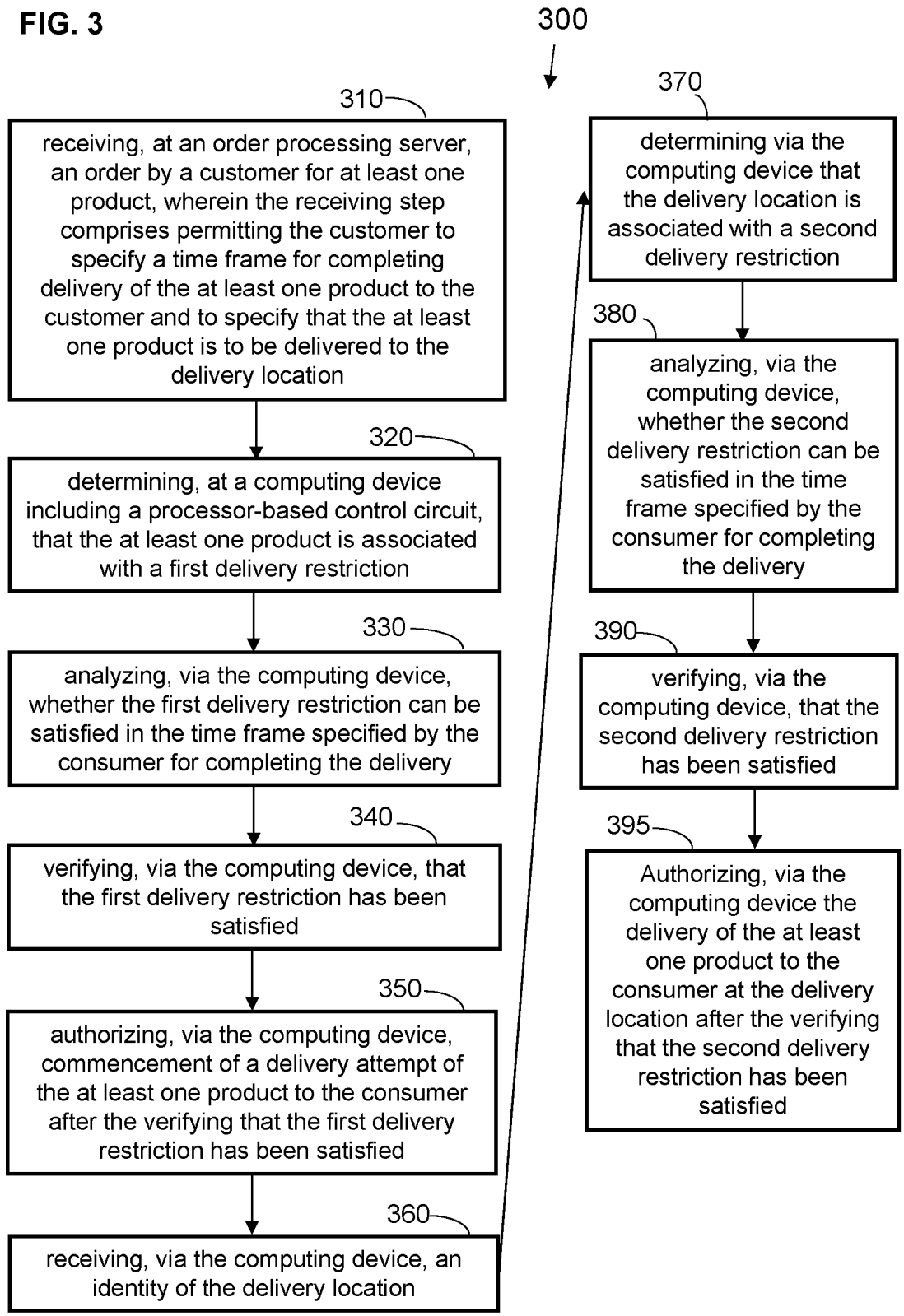

SYSTEMS AND METHODS FOR ANALYZING DELIVERY RESTRICTIONS WHEN DELIVERING PRODUCTS ORDERED BY A CUSTOMER

CROSS-REFERENCE TO RELATED APPLICATION

This application claims the benefit of U.S. Provisional Application No. 62/360,797, filed Jul. 11, 2016, and is incorporated herein by reference in its entirety.

TECHNICAL FIELD

This invention relates generally to providing purchased products to customers and, in particular, to facilitating delivery of products purchased by a customer to the customer.

BACKGROUND

Customers often purchase products from retailers over the internet. Generally, the products purchased by a customer are delivered by the retailer to an address provided by the customer. Some products ordered by customers are associated with regulatory and/or other restrictions that may delay and/or prohibit delivery of such products to the customer. In addition, some delivery locations specified by a customer may be associated with access and/or other restrictions that may delay and/or prevent delivery of such products to the customer. A retailer's inability to deliver products ordered by a customer within a promised window of time due to product-related or delivery address-related restrictions typically results in extra costs for the retailer associated with returning such products to the warehouse and re-delivery of the products on a subsequent date. In addition, a retailer's inability to deliver products ordered by a customer within a promised window of time due to product-related or delivery address-related restrictions is likely to cause the customer to be unhappy and may result in a loss of customer of the retailer.

BRIEF DESCRIPTION OF THE DRAWINGS

Disclosed herein are embodiments of systems, apparatuses, methods, and systems pertaining to delivering products to a customer. This description includes drawings, wherein:

FIG. 3 is a flow chart diagram of a process of delivering products to the customer in accordance with some embodiments.

Figure 1:
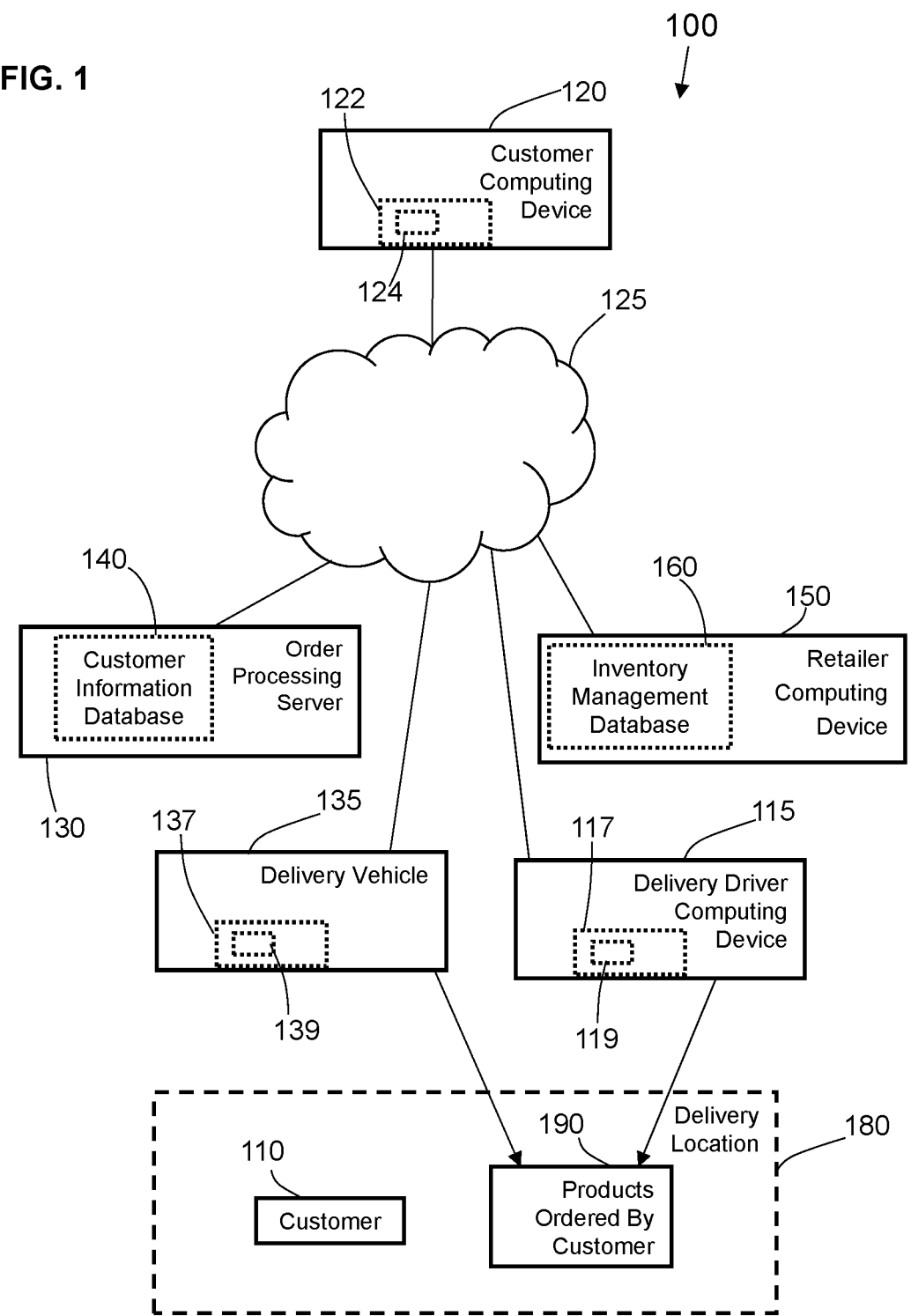
FIG. 1 is a diagram of a system of delivering products to the customer in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for delivering products to the customer while analyzing and satisfying product-associated and/or delivery location-associated restrictions.

In some embodiments, a system of delivering products to a specified delivery location includes an order processing server configured to receive an order by a customer for at least one product. The order processing server is configured to permit the customer to specify a time frame for completing delivery of the at least one product to the customer and to specify that the at least one product is to be delivered to the delivery location. The system further includes a computing device including a processor-based control circuit. The control circuit is configured to: determine that the at least one product is associated with a first delivery restriction; analyze whether the first delivery restriction can be satisfied in the time frame specified by the customer for completing the delivery; verify that the first delivery restriction has been satisfied; authorize commencement of a delivery attempt of the at least one product to the customer after verification that the first delivery restriction has been satisfied; receive an identity of the delivery location; determine that the delivery location is associated with a second delivery restriction; analyze whether the second delivery restriction can be satisfied in the time frame specified by the customer for completing the delivery; verify that the second delivery restriction has been satisfied; and authorize the delivery of the at least one product to the customer at the delivery location after verification that the second delivery restriction has been satisfied.

In other embodiments, a method of delivering products to a specified delivery location includes: receiving, at an order processing server, an order by a customer for at least one product, wherein the receiving step comprises permitting the customer to specify a time frame for completing delivery of the at least one product to the customer and to specify that the at least one product is to be delivered to the delivery location; determining, at a computing device including a processor-based control circuit, that the at least one product is associated with a first delivery restriction; analyzing, via the computing device, whether the first delivery restriction can be satisfied in the time frame specified by the customer for completing the delivery; verifying, via the computing device, that the first delivery restriction has been satisfied; authorizing, via the computing device, commencement of a delivery attempt of the at least one product to the customer after the verifying that the first delivery restriction has been satisfied; receiving, via the computing device, an identity of the delivery location; determining via the computing device that the delivery location is associated with a second delivery restriction; analyzing, via the computing device, whether the second delivery restriction can be satisfied in the time frame specified by the customer for completing the delivery; verifying, via the computing device, that the second delivery restriction has been satisfied; and authorizing the delivery of the at least one product to the customer at the delivery location after the verifying that the second delivery restriction has been satisfied.

FIG. 1 shows an embodiment of a system 100 for delivering products 190 purchased by a customer 110 from a retailer to a delivery location 180. The retailer may be any entity operating as a brick-and-mortar physical location and/or a website accessible, for example, via the internet or another network, by way of which products 190 may be ordered by a customer 110. A customer 110 may be an individual or business entity. Exemplary products 190 that may be ordered by the customer 110 via the system 100 may include, but are not limited to, general-purpose customer goods, as well as consumable products, such as medications, food items, and dietary supplements.

The exemplary system 100 depicted in FIG. 1 includes an order processing server 130 of the retailer configured to process a purchase order by the customer 110 for one or more products 190. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 125. The network 125 may be a wide-area network (WAN), a local area network (LAN), a personal area network (PAN), a wireless local area network (WLAN), or any other internet or intranet network, or combinations of such networks. Generally, communication between various electronic devices of system 100 may take place over hardwired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to a customer information database 140. In some embodiments, the customer information database 140 may be configured to store information associated with customers 110 of the retailer who order products 190 from the retailer. In some embodiments, the customer information database 140 may store electronic information including but not limited to: personal information of the customer 110, including payment method information, delivery address information and any known delivery access restrictions associated with the address, product order history, pending order status, product order options, as well as product delivery options.

The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based. In some embodiments, the order processing server 130 may be also coupled to an electronic database configured to store information associated with the inventory of products 190 made available by the retailer to the customer 110. In other words, while the order processing server 130 is illustrated in FIG. 1 as being coupled to one electronic database (i.e., customer information database 140), it will be appreciated that the order processing server 130 may be additionally coupled to an electronic database akin to the inventory management database 160 configured to store product inventory information In some embodiments, when a customer 110 initially sets up an online account with the retailer, the system 100 (i.e., order processing server 130 or another server on the system 100 dedicated to new customer sign-up) is configured to permit the customer 110 to generate a customer profile including personal information of the customer 110 (e.g., name, address, phone number, and the like), payment methods (e.g., credit card information), as well as product delivery settings of the customer 110 (e.g., preferred delivery address and/or preferred delivery method). It will be appreciated that the customer 110 may select new options and/or update previously selected options at any time after setting up the account with the retailer. In some embodiments, the personal information of the customer 110 and any product delivery options selected by the customer 110 are stored in the customer information database 140 for subsequent retrieval by the order processing server 130 and/or by a retailer computing device 150 (e.g., in response to a login request by the customer 110, or product order placement by the customer 110).

In some embodiments, as the customer 110 is connecting to the retailer's website, the order processing server 130 may request a verification of the identity (e.g., username/password) of the customer 110. The order processing server 130 may first verify the identity of the customer 110 (e.g., by comparing the username/password data entered by the customer 110 into the login interface against username/password data in the profile of the customer 110 stored in the customer information database 140). The order processing server 130 may then associate the customer profile with the identity of the customer 110, retrieve the customer profile from the customer information database 140 based on information stored in the profile, and send the retrieved customer account information to the customer computing device 120, which includes a graphical interface 122 including one or more input fields 124 that permit the customer 110 to customize various options relating to the ordering of products 190 from the retailer and/or the delivering of the ordered products 190 to the customer 110.

The customer 110 may access the order processing server 130 of the retailer via a customer computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130. In some embodiments, the customer 110 may access the order processing server 130 of the retailer via a graphical interface 122 displayed to the customer 110 on the customer computing device 120. The graphical interface 122 may include one or more graphical input fields 124 in the form of menu options and/or sub-interfaces that permit the customer 110 to place an order for one or more products 190 and to select a delivery option for one or more products 190 ordered by the customer 110. In some embodiments, the graphical interface 122 may be a retailer-associated mobile application (app) installed on the customer computing device 120 and configured to display various above-described menu options, notifications, and/or alerts for the customer 110. For example, electronic alerts may be transmitted to the customer computing device 120 via the network 125 from the retailer computing device 150 and/or from the order processing server 130 and displayed via the graphical interface 122.

In some embodiments, after placing an on order for one or more products 190 via the order processing server 130 using the graphical interface 122 of the customer computing device 120, the customer 110 can specify a delivery location 180 where the products 190 ordered by the customer 110 are to be delivered. For example, the customer 110 may use the customer computing device 120 to select (via one or more input fields 124 of the graphical interface 122) delivery of the ordered products 190 to the home address of the customer 110, business address of the customer 110, another address designated by the customer, or a specified geographic or landmark location (i.e., park, beach, stadium, etc.) specified by the customer. In some embodiments, the customer 110 may specify that the products 190 be delivered to a delivery locker location elected by the customer 110, a physical location of a car of the customer 110, a physical location of a delivery locker specified by the customer 110, a physical location of the customer 110, or a physical location of a person other than the consumer.

In some embodiments, the order processing server 130 is configured to enable the customer 110 to specify a time frame for completing delivery of the customer-ordered products 190 to the customer 110 and to specify that the products 190 are to be delivered to a delivery location 180 where the customer 110 is physically present. In some embodiments, the order processing server 130 is configured to enable the customer 110 to specify a delivery method (e.g., aerial drone, autonomous ground vehicle, delivery drive, etc.) In some embodiments, the customer 110 is permitted to specify that the product 190 or products 190 ordered by the customer 110 be delivered to a geographic location of a customer computing device 120 of the customer 110. In one aspect, the order processing server 130 is configured to permit the customer 110 to specify that the products 190 are to be delivered on the day the order is placed by the customer 110 and to specify that the delivery location 180 is a location of a customer computing device 120. In some embodiments, the retailer computing device 150 is configured to track the geographic location of the customer computing device 120 via global positioning system (GPS) data associated with the customer computing device 120 after the commencement of a delivery attempt of the products 190 ordered by the customer 110, and to set the identity of the delivery location 180 based on the tracked geographic location of the customer computing device 120.

In some embodiments, the order processing server 130 is configured to receive and process an order by a customer 110 for a product 190 from the customer computing device 120, to receive and process payment for the product 190 from the customer 110, and to transmit (e.g., via the network 125) the customer's selection of a delivery location 180 for the ordered products 190 to a retailer computing device 150 associated with the selected delivery location 180 of the customer 110 who placed the order. It will be appreciated that while the order processing server 130 and the retailer computing device 150 may be located at separate physical locations (e.g., regional/central data center, product distribution center, retail store, or the like), the retailer computing device 150 and the order processing server 130 of the system 100, in some embodiments, may be confined to a single facility.

The retailer computing device 150 may be a stationary or portable electronic device, for example, a desktop computer, a laptop computer, a tablet, a mobile phone, or any other electronic device including a processor-based control circuit (i.e., control unit). In the embodiment of FIG. 1, the retailer computing device 150 is configured for data entry and processing as well as for communication with other devices of system 100 via the network 125 which, as described above, may be a wide-area network (WAN), a local area network (LAN), a personal area network (PAN), a wireless local area network (WLAN), or any other internet or intranet network, or combinations of such networks. In some embodiments, as will be described below, the retailer computing device 150 is configured to access one or more of the inventory management database 160 and customer information database 140 via the network 125 to facilitate delivery of the products 190 ordered by a customer 110 to a delivery location 180 selected by the customer 110 while analyzing and/or satisfying delivery restrictions associated with the products 190 and/or the delivery location 180 selected by the customer 110.

Figure 2:
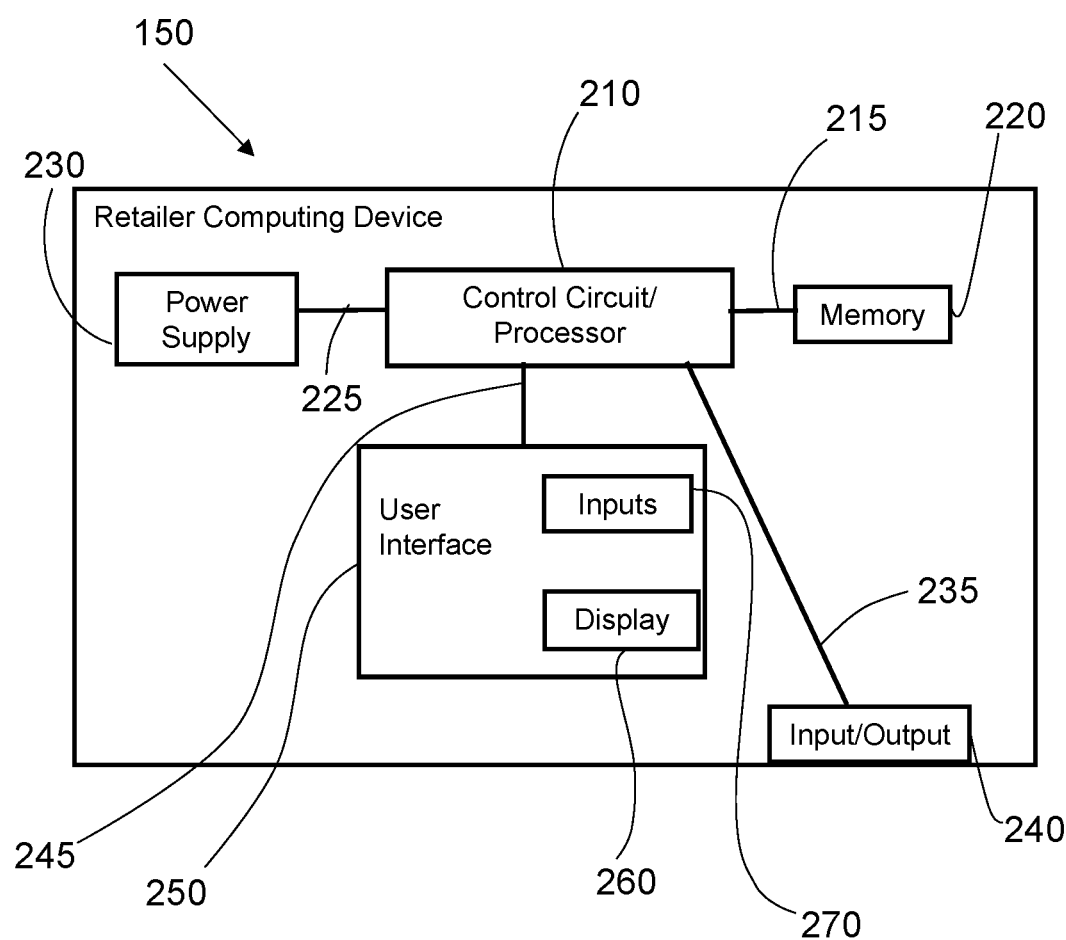
FIG. 2 is a functional diagram of an exemplary computing device usable with the system of FIG. 1 in accordance with some embodiments.

With reference to FIG. 2, an exemplary retailer computing device 150 configured for use with the systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control unit 210 of the retailer computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the retailer computing device 150 is also electrically coupled via a connection 235 to an input/output 240 that can receive signals from the order processing server 130 (e.g., data from the customer information database 140 relating to an order for a product 190 placed by the customer 110 and/or information (e.g., delivery restrictions) associated with a delivery location 180 selected by the customer 110) or from any other source that can communicate with the retailer computing device 150 via a wired or wireless connection. The input/output 240 of the customer computing device 120 can also send signals to the order processing server 130 (e.g., data including product out-of-stock information regarding the product for which an order is placed by the customer 110 via the order processing server 130), or to any other device in wired or wireless communication with the retailer computing device 150.

In the embodiment shown in FIG. 2, the processor-based control unit 210 of the retailer computing device 150 is electrically coupled via a connection 245 to a user interface 250, which may include a visual display or display screen 260 (e.g., LED screen) and/or button input 270 that provide the user interface 250 with the ability to permit an operator of the retailer computing device 150 to manually control the retailer computing device 150 by inputting commands via touch-screen and/or button operation and/or voice commands to, for example, to communicate with the customer computing device 120 and/or a delivery driver computing device 115 and/or a delivery vehicle 135 (e.g., an aerial drone, an autonomous ground vehicle, or the like). It will be appreciated that the performance of such functions by the processor-based control unit 210 of the retailer computing device 150 is not dependent on a human operator, and that the control unit 210 may be programmed to perform such functions without a human operator.

In some embodiments, the display screen 260 of retailer computing device 150 is configured to display various graphical interface-based menus, options, and/or alerts that may be transmitted to the retailer computing device 150 and displayed on the display screen 260 in connection with various aspects of the order placed by the customer 110. The inputs 270 of the retailer computing device 150 may be configured to permit an operator to navigate through the on-screen menus on the retailer computing device 150 and make changes and/or updates to the delivery locations 180 associated with a customer 110. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the retailer computing device 150 is programmed to determine that one or more products 190 ordered by the customer 110 via the order processing server 130 is associated with a first delivery restriction. For example, when a customer 110 requests delivery of a product associated with a prescription (e.g., a medication), a first or preliminary restriction may include but is not limited to: a requirement of confirmation that the type of medication ordered for delivery by the customer 110 can be legally delivered to the customer 110 by the retailer; a requirement of confirmation that the retailer-offered delivery methods (e.g., aerial drone, driver and vehicle, friend or family member, or the like) may be used to deliver the type of medication ordered for delivery by the customer 110; and a requirement of confirmation that the type of medication ordered for delivery by the customer 110 may be delivered to the customer 110 within the time window requested by the customer 110.

In some embodiments, the control circuit 210 of the retailer computing device 150 is programmed to analyze whether the first delivery restriction can be satisfied in the time frame specified by the customer 110 for completing the delivery of the products 190 to the customer 110. In one aspect, the control circuit 210 of the retailer computing device 150 is programmed to verify that the first delivery restriction associated with the product 190 has been satisfied. For example, if a product 190 ordered by a customer 110 is a prescription medication, the control circuit 210 may access the inventory management database 160 to access information stored in association with the product 190 to determine whether this product 190 may be legally delivered to the customer 110, or is restricted to in-store pick up only.

In another aspect, the control circuit 210 may access the inventory management database 160 to access information stored in association with the product 190 to determine whether the product 190 may be delivered by an aerial drone to an address of the customer 110, or whether personal delivery to the customer 110 via a delivery truck and driver is required. In yet another aspect, the control circuit 210 may access the inventory management database 160 to access information stored in association with the product 190 to determine whether the product 190 is in stock such that it may be timely delivered to the customer 110 within the delivery time window specified by the customer 110, or whether the product 190 is out of stock and/or on back order, and cannot be delivered to the customer 110 within the customer-specified delivery time window.

It will be appreciated that the control circuit 210 of the retailer computing device 150 is programmed to communicate not only with the inventory management database 160 to determine whether the product 190 ordered by the customer 110 is associated with a first delivery restriction and to verify that the first delivery restriction has been satisfied. For example, in some aspects, the control circuit 210 is programmed to communicate (e.g., via the network 125) with one or more remote servers and/or remote portable computing devices containing information associated with the product 190 ordered by the customer 110 facilitating a determination by the control unit 210 as to whether a first delivery restriction exists and whether the first delivery restriction has been satisfied. In one aspect, the control circuit 210 of the retailer computing device 150 may communicate, over the network 125, with a $3^{rd}$ party server such as a health insurance profitability and accountability act (HIPAA) database that may store guidelines and restrictions associated with prescription medication products 190 ordered by the customer 110.

In some embodiments, the control circuit 210 of the retailer computing device 150 is programmed to authorize commencement of a delivery attempt of the product 190 to the customer 110 after verification that the first delivery restriction associated with the product 190 has been satisfied. In one aspect, the control circuit 210 of the retailer computing device 150 is configured to receive, from an electronic device remote to the retailer computing device 150, a confirmation that the first delivery restriction associated with the product 190 has been satisfied. For example, the control circuit 210 of the retailer computing device 150 may receive, via the network 125, a transmission from a $3^{rd}$ party server (e.g., HIPAA and/or federal aviation administration (FAA)) that the product ordered by the customer 110 may be legally transported by an aerial drone and dropped off at a delivery location 180 specified by the customer 110.

In one aspect, prior to, or after the commencement of the delivery attempt of one or more products 190 to the customer 110, the control circuit 210 of the retailer computing device 150 is programmed to receive and/or otherwise obtain an identity of the delivery location 180. For example, in a situation where the customer 110 requested delivery of the products 190 to the home of the customer 110, the control circuit 210 may obtain the address information associated with the customer 110 from the customer information database 140, in a situation where the customer 110 requested delivery of the products 190 to a delivery locker associated with the geographic location of the customer 110, the control unit 210 may obtain the address information associated with the locker, and in a situation where the customer 110 requested delivery of the products to a location of the customer computing device 120 or a location of the car of the customer 110, the control unit 210 may receive GPS positioning data associated with a current location of the customer computing device 120 or of the car of the customer 110 from a remote server configured to transmit such GPS positioning data over the network 125 to the retailer computing device 150.

In some embodiments, after the identity of the delivery location 180 is known, the control circuit 210 of the retailer computing device 150 is programmed to determine whether the delivery location 180 where one or more products 190 ordered by the customer 110 are to be delivered is associated with a second delivery restriction. For example, when a customer 110 requests delivery of a product 190 to a specified delivery location 180, a second or final restriction associated with the delivery location 180 may include but is not limited to: a requirement of confirmation that physical access to the delivery location 180 is permitted, a requirement of confirmation that a person present at the delivery location 180 is authorized to receive the product 190; a requirement of confirmation that the identity of the person present at the delivery location 180 can be property authenticated.

In some embodiments, the control circuit 210 of the retailer computing device 150 is programmed to analyze whether the second delivery restriction can be satisfied in the time frame specified by the customer 110 for completing the delivery of the products 190 to the customer 110. In one aspect, the control circuit 210 of the retailer computing device 150 is programmed to verify that the second delivery restriction associated with the delivery location 180 has been satisfied. For example, if a product 190 ordered by a customer 110 is a prescription medication and the customer 110 is not present at the delivery location 180, the control circuit 210 may access the inventory management database 160 to access information stored in association with the product 190 to determine whether this product 190 may be legally delivered to a person other than the customer 110, or must be handed personally to the customer 110. In another aspect, the control circuit 210 may access the customer information database 140 to access information stored in association with the delivery location 180 to determine whether the delivery location 180 may be accessed by an aerial drone or only by a delivery driver. In yet another aspect, the control circuit 210 may access the customer information database 140 to access information stored in association with the delivery location 180 to determine whether the delivery location 180 is associated with one or more persons who are pre-authorized to receive the product 190 on behalf of the customer 110, and who may be properly authenticated by an aerial drone and/or by the delivery driver.

It will be appreciated that the control circuit 210 of the retailer computing device 150 is programmed to communicate not only with the customer information database 140 and/or the inventory management database 160 to verify that the second delivery restriction has been satisfied. For example, in some aspects, the control circuit 210 is programmed to communicate via the network 125 with one or more $3^{rd}$ party servers containing access information associated with the delivery location 180 and/or with the delivery driver computing device 115 and/or with the delivery vehicle 135 to reach a determination by the control unit 210 that the second delivery restriction has been satisfied.

In some embodiments, the control circuit 210 of the retailer computing device 150 is programmed to authorize delivery of the product 190 to the customer 110 at the delivery location 180 after verification that the second delivery restriction has been satisfied. In one aspect, the control circuit 210 of the retailer computing device 150 is configured to receive, from an electronic device remote to the retailer computing device 150 (e.g., delivery driver computing device 115, delivery vehicle 135, or the like), a confirmation that the second delivery restriction has been satisfied. For example, the control circuit 210 of the retailer computing device 150 may receive, via the network 125, a transmission from a delivery driver computing device 115 or from a delivery vehicle 135 (e.g., an aerial drone or autonomous ground vehicle), that the delivery location 180 is readily accessible and that a person who is an authorized recipient of the product 190 on behalf of the customer 110 and who may be readily authenticated is present at the delivery location 180.

In some embodiments, when the delivery is being made (e.g., via a delivery driver, delivery vehicle 135, or the like) to the customer 110 who placed the order (or a person accepting delivery on behalf of the customer 110), the control unit 210 is configured to receive, via the network 125, an authentication of an identity of the customer 110 (or of the person accepting delivery on behalf of the customer 110) at the delivery location 180. In one aspect, a delivery driver may visually inspect a physical identification card (e.g., Driver's License) of the customer 110 or person accepting delivery on behalf of the customer 110 to verify the identity of the customer 110 or other person, and then transmit over the network 125 an indication of authentication of the customer 110 or other person to the retailer computing device 150 via the delivery driver computing device 115. In one aspect, a delivery driver may use the delivery driver computing device 115 to scan either the physical identification card (e.g., Driver's License) or the graphical interface 122 of the customer computing device 120 to verify the identity of the customer 110, and then transmit over the network 125 an indication of authentication of the customer 110 to the retailer computing device 150 via the delivery driver computing device 115. In yet another aspect, a delivery vehicle 135 (e.g., an aerial drone or autonomous ground vehicle) may scan (e.g., via a camera installed on the delivery vehicle 135) either the physical identification card (e.g., Driver's License) or the graphical interface 122 of the customer computing device 120 to verify the identity of the customer 110, and then transmit over the network 125 an indication of authentication of the customer 110 to the retailer computing device 150.

In some embodiments, the control unit 210 is configured to authorize (e.g., via a transmission of a signal over the network 125 to the delivery driver computing device 115 or to a delivery vehicle 135) a hand off of the product 190 directly to the customer 110 at the delivery location 180 based on the authentication of the identity of the customer 110 at the delivery location 180, which may be performed as described above. In one aspect, upon a successful completion of a delivery of the product 190 to the customer 110, the control circuit is 210 configured to receive, over the network 125, from the customer computing device 120 and/or from the delivery driver computing device 115, and/or from the delivery vehicle 135, an electronic confirmation that the product 190 has been successfully delivered to the customer 110 at the delivery location 180.

In some embodiments, the control circuit 210 of the retailer computing device 150 is programmed to generate customer alerts in connection with the delivery of the products 190 to the customer 110 or a person authorized to receive the products 190 on behalf of the customer 110. The customer alerts may be generated by the retailer computing device 150 based on information received from the delivery driver computing device 115 and/or the delivery vehicle 135 and/or the order processing server 130 and/or the customer information database 140 and/or the inventory management database 160. In the embodiment shown in FIG. 1, the customer alerts may be transmitted from the retailer computing device 150 via the network 125 to the customer computing device 120, and the customer computing device 120 may transmit data responsive to the customer alerts and/or other data to the retailer computing device 150 via the network 125. For example, the retailer computing device 150 may transmit a signal over the network 125 to the customer computing device 120 including an alert indicating that the product 190 has been dropped off by a delivery driver at the delivery location 180, or an alert indicating that the delivery driver was unable to access the delivery location 180. Similarly, the customer computing device 120 may transmit a signal over the network 125 to the retailer computing device 150 including a notification that the product 190 ordered by the customer 110 has been successfully delivered to the customer 110 at the delivery location 180. In some embodiments, customer alerts sent to the customer computing device 120 may include but are not limited to short message service (SMS) messages, electronic mail (e-mail) messages, instant messenger messages, voice mail messages, and/or push notifications (to a mobile application installed on the customer computing device 120).

FIG. 3 shows an embodiment of an exemplary method 300 of delivering products 190 purchased by a customer 110 to a specified delivery location 180. The embodiment of the method 300 illustrated in FIG. 3 includes receiving, at an order processing server 130, an order by a customer 110 for one or more products 190 and permitting the customer 110 to specify a time frame for completing delivery of the product 190 or products 190 to the customer 110 and to specify that the product 190 or products 190 are to be delivered to the delivery location 180 (step 310). After the purchase order of the customer 110 for one or more products 190 is processed at the order processing server 130, the exemplary method 300 further includes determining, at the retailer computing device 150, that one or more products 190 ordered by the customer 110 is associated with a first delivery restriction (step 320).

As described above, a first delivery restriction may include but is not limited to a requirement of confirmation that the type of medication ordered for delivery by the customer 110 can legally be delivered to the customer 110 by the retailer; a requirement of confirmation that the retailer-offered delivery methods (e.g., aerial drone, driver and vehicle, friend or family member, or the like) may be used to deliver the type of medication ordered for delivery by the customer 110; and a requirement of confirmation that the type of medication ordered for delivery by the customer 110 may be delivered to the customer 110 within the time window requested by the customer 110. In one aspect, after a customer 110 elects to have a product 190 delivered to the customer 110, the retailer computing device 150 queries the customer information database 140 and/or the inventory management database 160 to determine whether one or more first restrictions are associated with the product 190 ordered by the customer 110.

Upon a determination (e.g., by the control circuit 210 of the retailer computing device 150) that the product 190 ordered by the customer 110 for delivery is associated with a first delivery restriction, the exemplary method 300 of FIG. 3 further includes analyzing, via the retailer computing device 150, whether the first delivery restriction can be satisfied in the time frame specified by the customer 110 for completing the delivery (step 330). In one aspect, this analysis is performed by obtaining, via the control circuit 210 of the retailer computing device 150, information stored in the inventory management database 160 and/or on publicly accessible remote servers in association with the product 190. In one aspect, such obtained information facilitates a determination by the control circuit 210 of the retailer computing device 150 as to how much time is required to satisfy any first restriction associated with the product 190, and whether the time required to satisfy the first restriction would leave enough time for the retailer to deliver the product 190 to the customer 110 within the time frame specified by the customer 110 for delivery.

In the exemplary method 300 of FIG. 3, the analysis performed by the control circuit 210 of the retailer computing device 150 includes verifying that the first delivery restriction associated with the product 190 ordered by the customer 110 has been satisfied (step 340). As described above, in one aspect, if a product 190 ordered by a customer 110 is a medication, the control circuit 210 may verify satisfaction of the first delivery restriction associated with the product 190 by accessing the inventory management database 160 to access information stored in association with the product 190 and indicating that this product 190 is a prescription medication that may in fact be legally delivered to the customer 110, and is not limited by the applicable regulatory guidelines to store pick up only.

The exemplary method 300 of FIG. 3 further includes authorizing, via the retailer computing device 150, commencement of a delivery attempt of one or more products 190 to the customer 110 after the verifying in step 340 that the first delivery restriction has been satisfied (step 350). In one aspect, such authorizing may include transmitting an authorization to commence the delivery attempt from the retailer computing device 150, over the network 125, to the delivery driver computing device 115 and/or to the delivery vehicle 135.

The method 300 illustrated in FIG. 3 further includes receiving and/or otherwise obtaining an identity of the delivery location 180 via the retailer computing device 150 (step 360). The identity of the delivery location 180 may be obtained by the retailer computing device 150 prior to or after the commencement of the delivery attempt of one or more products 190 to the customer 110. For example, in a situation where the customer 110 requested delivery of the products to a location of the customer computing device 120 (e.g., when the customer 110 is at a park, on the beach, at work, or any other public or residential/commercial location while in possession of his or her customer computing device 120), the method 300 may include receiving, via the retailer computing device 150, GPS positioning data associated with a current location of the customer computing device 120 (e.g., from a remote server configured to transmit such GPS positioning data over the network 125 to the retailer computing device 150). In some aspects, the GPS positioning data associated with the current location of the customer computing device 120, when obtained by the retailer computing device 150 (e.g., directly from the customer computing device 120 or directly from a server or satellite in communication with the customer computing device 120), enables the retailer computing device 150 to identify the delivery location 180 where the product 190 is to be delivered to the customer 110.

In some embodiments, after the commencement of a delivery attempt of the products 190 ordered by the customer 110 to the delivery location 180, the method 300 of FIG. 3 includes determining, via the retailer computing device 150, that the delivery location 180 is associated with a second delivery restriction (step 370). As described above, a second delivery restriction may include but is not limited to: a requirement of confirmation that access to the delivery location 180 is permitted, a requirement of confirmation that a person present at the delivery location 180 is authorized to receive the product 190; a requirement of confirmation that the identity of the person present at the delivery location 180 can be property authenticated, or the like. In one aspect, after the commencement of the delivery attempt of the products 190 ordered by the customer 110 to the delivery location 180 (e.g., by a delivery carrier such as a delivery driver or a delivery vehicle (e.g., a drone) 135), the retailer computing device 150 queries the customer information database 140 and/or the inventory management database 160 and/or the delivery driver computing device 115 and/or the delivery vehicle 135, and/or any other electronic database to determine whether one or more second restrictions are associated with the delivery location 180.

Upon the determining (e.g., by the control circuit 210 of the retailer computing device 150) that the delivery location 180 is associated with a second delivery restriction, the exemplary method 300 of FIG. 3 further includes analyzing, via the retailer computing device 150, whether the second delivery restriction can be satisfied in the time frame specified by the customer 110 for completing the delivery (step 380). In one aspect, this analysis is performed by obtaining, via the control circuit 210 of the retailer computing device 150, information stored in the customer information database 140 or transmitted by the delivery driver computing device 115 to determine whether the second restriction may be satisfied, how much time would be required to satisfy the second restriction associated with the delivery location 180, and whether satisfaction of the second delivery restriction would permit the delivery of the product 190 to the customer 110 within the time frame specified by the customer 110 for delivery. The exemplary method 300 of FIG. 3 further includes verifying, via the control circuit 210 of the retailer computing device 150, that the second delivery restriction has been satisfied (step 390). As described above, in one aspect, if a product 190 ordered by a customer 110 is a prescription medication requiring delivery only to the customer 110 personally, the control circuit 210 may verify satisfaction of the second delivery restriction associated with the product 190 by receiving an electronic message via the network 125 from the delivery driver computing device 115 indicating that the customer 110 is present at the delivery location 180 and has proper authentication credentials to enable the delivery driver to verify the identity of the customer 110.

The exemplary method 300 of FIG. 3 further includes authorizing, via the retailer computing device 150, the delivery of the product 190 to the customer 110 at the delivery location 180 after the verifying in step 390 that the second delivery restriction has been satisfied (step 395). In one aspect, such authorizing may include transmitting from the retailer computing device 150 to the delivery driver computing device 115 (via the network 125) an electronic authorization to hand off the product 190 directly to the customer 110 at the delivery location 180 based on the authentication of the identity of the customer 180 at the delivery location 180. In one aspect, upon a successful completion of a delivery of the product 190 to the customer 110, the method 300 may further include receiving, at the retailer computing device 150, over the network 125, an electronic confirmation (e.g., from the customer computing device 120, delivery driver computing device 115, or delivery vehicle 135) that the product 190 has been successfully delivered to the customer 110 at the delivery location 180.

The systems and methods described herein advantageously allow customers to purchase products from a retailer and have the products delivered to the customers at any delivery location the customers designate even if the products ordered by the customers are associated with one or more restrictions, and if the delivery location where the products are to be delivered is associated with one or more restrictions. Such systems and methods provide a significant convenience for the customers of the retailer and are likely to increase customer loyalty to the retailer. In addition, such systems and methods provide retailers with significant operation cost savings, since deliveries are only initiated after the system determines that the product and/or delivery location restrictions can be successfully met within the delivery frame allotted for delivery.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system of delivering products to a specified delivery location, the system comprising:
    an order processing server configured to receive an order by a customer for at least one product, the order processing server being configured to permit the customer to specify a time frame, from receipt of the order, for completing delivery of the at least one product to the customer and to specify that the at least one product is to be delivered to the delivery location, wherein the order processing server is further configured to permit the customer to specify that the delivery location is a location of an electronic mobile communication device of the customer;
    a computing device including a processor-based control circuit, the control circuit configured to:
    determine that the at least one product is associated with a first delivery restriction;
    analyze whether the first delivery restriction can be satisfied in the time frame specified by the customer for completing the delivery;
    verify that the first delivery restriction has been satisfied;
    authorize commencement of a delivery attempt of the at least one product to the customer after verification that the first delivery restriction has been satisfied;
    determine that the delivery location is associated with a second delivery restriction;
    analyze whether the second delivery restriction can be satisfied in the time frame specified by the customer for completing the delivery;
    verify that the second delivery restriction has been satisfied; and
    in response to an autonomous determination by the control system that the at least one product can be delivered to the delivery location within the time frame specified by the customer for completing the delivery:
        authorize the delivery of the at least one product to the customer at the delivery location after verification that the second delivery restriction has been satisfied;
        obtain an electronic location signal transmitted from the electronic mobile communication device of the customer;

track a geographic location of the mobile communication device of the customer by analyzing the electronic location signal after the commencement of the delivery attempt;

determine an identity of the delivery location based on tracking the geographic location of the mobile communication device of the customer;

receive, from an aerial drone or an autonomous ground vehicle, a notification that the delivery location is accessible, that the customer is present at the delivery location, and that the aerial drone or the autonomous ground vehicle is in position at the delivery location to authenticate an identity of the customer;

in response to receipt of the notification that the delivery location is accessible, that the customer is present at the delivery location, and the aerial drone or the autonomous ground vehicle is in position at the delivery location to authenticate the identity of the customer, transmit a signal instructing the aerial drone or the autonomous ground vehicle to authenticate the identity of the customer; and in response to receipt, from the electronic mobile communication device of the customer, of credentials that permit an authentication of an identity of the customer at the delivery location, transmit an electronic signal indicating that the customer is permitted to take possession of the at least one product delivered to the delivery location;

wherein the control unit is further configured to authorize a hand off of the at least one product directly to the customer at the delivery location based on the authentication of the identity of the customer at the delivery location; and wherein, in response to receiving, from both an electronic mobile communication device of the customer and the aerial drone or the autonomous ground vehicle, a confirmation that the at least one product has been handed off to the customer at the delivery location, the control circuit is configured to mark the at least one product as having been successfully delivered to the customer.

2. The system of claim 1, wherein the order processing server is further configured to permit the customer to specify that the at least one product is to be delivered on the day the order is placed by the customer.

3. The system of claim 1, wherein the control circuit is further configured to analyze whether the first delivery restriction can be satisfied in the time frame specified by the customer for completing the delivery and determine at least one of: whether the at least one product may be legally delivered to the delivery location; whether a method of delivery suitable for the delivery of the at least one product to the delivery location is available; and whether the at least one product can be delivered to the customer at the delivery location within the time frame specified by the customer.

4. The system of claim 1, wherein the control circuit is further configured to receive, from an electronic device remote to the computing device, a confirmation that the first delivery restriction has been satisfied.

5. The system of claim 1, wherein the control circuit is further configured to analyze whether the second delivery restriction can be satisfied in the time frame specified by the customer for completing the delivery and determine at least one of: whether the delivery location is accessible by a delivery service; whether the at least one product can be handed to a person at the delivery location other than the customer to complete the delivery; and whether an identity of the customer at the delivery location can be authenticated at time of the delivery.

6. The system of claim 1, wherein the control unit is further configured to receive a confirmation that the second delivery restriction has been satisfied.

7. A method of delivering products to a specified delivery location, the method comprising:

receiving, at an order processing server, an order by a customer for at least one product, wherein the receiving step comprises permitting the customer to specify a time frame, from receipt of the order, for completing delivery of the at least one product to the customer and to specify that the at least one product is to be delivered to the delivery location, wherein the receiving step further comprises permitting the customer to specify that the delivery location is a location of an electronic mobile communication device of the customer;

determining, at a computing device including a processor-based control circuit, that the at least one product is associated with a first delivery restriction;

analyzing, via the computing device, whether the first delivery restriction can be satisfied in the time frame specified by the customer for completing the delivery;

verifying, via the computing device, that the first delivery restriction has been satisfied;

authorizing, via the computing device, commencement of a delivery attempt of the at least one product to the customer after the verifying that the first delivery restriction has been satisfied;

determining via the computing device that the delivery location is associated with a second delivery restriction;

analyzing, via the computing device, whether the second delivery restriction can be satisfied in the time frame specified by the customer for completing the delivery;

verifying, via the computing device, that the second delivery restriction has been satisfied; and in response to an autonomous determination by the control system that the at least one product can be delivered to the delivery location within the time frame specified by the customer for completing the delivery:

authorizing, via the computing device, the delivery of the at least one product to the customer at the delivery location after the verifying that the second delivery restriction has been satisfied; and obtaining, via the computing device, an electronic location signal transmitted from the electronic mobile communication device of the customer;

tracking, via the computing device, a geographic location of the mobile communication device of the customer by analyzing, via the computing device, the electronic location signal after the commencement of the delivery attempt;

determining, via the computing device, an identity of the delivery location based on tracking the geographic location of the mobile communication device of the customer;

receiving, from an aerial drone or an autonomous ground vehicle, a notification that the delivery location is accessible, that the customer is present at the delivery location, and that the aerial drone or the autonomous ground vehicle is in position at the delivery location to authenticate an identity of the customer;

in response to the receiving of the notification that the delivery location is accessible, that the customer is present at the delivery location, and the aerial drone or the autonomous ground vehicle is in position at the delivery location to authenticate the identity of the customer, transmit a signal instructing the aerial drone or the autonomous ground vehicle to authenticate the identity of the customer; and in response to receipt, from the electronic mobile communication device of the customer, of credentials that permit an authentication of an identity of the customer at the delivery location, transmitting, via the computing device, an electronic signal indicating that the customer is permitted to take possession of the at least one product delivered to the delivery location;

handing the at least one product directly to the customer at the delivery location based on the authentication of the identity of the customer at the delivery location; and in response to receiving, from both an electronic mobile communication device of the customer and the aerial drone or the autonomous ground vehicle, a confirmation that the at least one product has been handed off to the customer at the delivery location, marking, by the computing device, the at least one product as having been successfully delivered to the customer.

8. The method of claim 7, wherein the receiving step further comprises permitting the customer to specify that the at least one product is to be delivered on the day the order is placed by the customer.

9. The method of claim 7, wherein the analyzing, via the computing device, whether the first delivery restriction can be satisfied in the time frame specified by the customer for completing the delivery further comprises: determining whether the at least one product may be legally delivered to the delivery location; determining whether a method of delivery suitable for the delivery of the at least one product to the delivery location is available; and determining whether the at least one product can be delivered to the customer at the delivery location within the time frame specified by the customer.

10. The method of claim 7, wherein the verifying that the first delivery restriction has been satisfied further comprises receiving, at the computing device and from an electronic device remote to the computing device, a confirmation that the first delivery restriction has been satisfied.

11. The method of claim 7, wherein the analyzing, via the computing device, whether the second delivery restriction can be satisfied in the time frame specified by the customer for completing the delivery further comprises: determining whether the delivery location is accessible by a delivery service; determining whether the at least one product can be handed to a person at the delivery location other than the customer to complete the delivery; and determining whether an identity of the customer at the delivery location can be authenticated at time of the delivery.

12. The method of claim 7, wherein the verifying that the second delivery restriction has been satisfied further comprises receiving, at the computing device and from an electronic device remote to the computing device, a confirmation that the second delivery restriction has been satisfied.

* * * * *